United States Patent [19]

Aunspach

[11] 4,130,182

[45] Dec. 19, 1978

[54] ROTARY SPRING-RETURN ACTUATOR WITH SAFETY FEATURE

[75] Inventor: Dale Aunspach, Cincinnati, Ohio

[73] Assignee: Xomox Corporation, Cincinnati, Ohio

[21] Appl. No.: 813,619

[22] Filed: Jul. 7, 1977

[51] Int. Cl.$^2$ .......................... F03G 1/06; F16K 31/04

[52] U.S. Cl. .......................... 185/45; 185/40 R

[58] Field of Search .................. 185/40 R, 45, 37, 39; 251/69, 71, 133

[56] References Cited

U.S. PATENT DOCUMENTS

| | | | |
|---|---|---|---|
| 1,292,267 | 1/1919 | Dawson et al. | 185/37 |
| 3,120,291 | 2/1964 | Nicholas et al. | 185/45 X |
| 3,122,351 | 2/1964 | Brown | 251/73 |
| 3,161,014 | 12/1964 | Abild | 60/7 |
| 3,279,744 | 10/1966 | Fieldsen et al. | 251/130 |
| 3,306,317 | 2/1967 | Brown | 137/458 |
| 3,592,991 | 7/1971 | Turner et al. | 185/37 X |
| 3,808,895 | 5/1974 | Fitzwater | 74/2 |
| 3,889,924 | 6/1975 | Karpenko | 185/40 R X |

FOREIGN PATENT DOCUMENTS

| | | | |
|---|---|---|---|
| 273988 | 5/1930 | Italy | 185/45 |

*Primary Examiner*—Allan D. Herrmann

*Attorney, Agent, or Firm*—J. Warren Kinney, Jr.

[57] ABSTRACT

A rotary spring-return actuator is provided with a combination safety clutch and travel stop wherein the safety clutch is secured relative to the housing of the spring-return actuator in such a manner as to insure that the potential energy within the spring of the spring-return will be completely dissipated before access to the interior of the housing may be effected.

11 Claims, 6 Drawing Figures

ROTARY SPRING-RETURN ACTUATOR WITH SAFETY FEATURE

BACKGROUND OF THE INVENTION

1. Field of the Invention

The field of the invention relates to spring-return actuators.

2. Description of the Prior Art

U.S. Pat. No. 3,122,351 to Brown discloses a spring-driven actuating mechanism for low torque valves which utilizes a clock spring 26 within drum housing 21 and cylindrical hub sleeve 27 of mounting plate 20. When valve plug 13 is "open" latch finger 28 is urged into latching position via spring 30.

Pressure in the control line maintains latch finger 28 in latching position whereas a drop in pressure releases the latch whereby the clock spring will close the valving member.

U.S. Pat. No. 3,306,317 to Brown discloses a high and low pressure-responsive actuator mechanism for plug-type valves wherein the means by which clock spring torque is applied to the stem of a plug valve 13 is substantially the same as in U.S. Pat. No. 3,122,351, supra. The primary difference in said patents being that in U.S. Pat. No. 3,306,317 the latch-release means are responsive to either high or low pressures.

U.S. Pat. No. 1,292,267 to Dawson, et al, discloses an energizing or tensioning device for spiral springs wherein one end of a spring is connected to a fixed part and the other end of the spring is attached to an oscillating shaft.

U.S. Pat. No. 3,161,014 to Abild discloses a spring-driven actuator mechanism where a spring is interposed between a driving means and a driven member, and wherein the driven member and the driving means are separated in response to a signal thereby enabling the spring to actuate the driven member.

U.S. Pat. No. 3,279,744 to Fieldsen, et al, discloses a valve actuator wherein the valve-closing action of spring 57 is opposed by the electrically operated brake of an electric motor which opens the valving member against the counter-force of spring 57.

U.S. Pat. No. 3,592,991 to Turner, et al, discloses a torque converter which utilizes the energy storing capability of a torsion spring connecting an input and an output shaft to provide a uniform driving force on the output shaft throughout the final arc of movement of the output shaft irrespective of the speed at which the input shaft is rotated so as to provide a uniform high terminal velocity to a switch plate upon closure without sufficiently high impact to damage the spring-actuated switch.

U.S. Pat. No. 3,808,895 to Fitzwater discloses an electrically operated fail-safe valve actuator which utilizes a spring which is wound to store energy during the operation of an electrical drive motor and which includes an electric clutch operable to disengage the drive motor from the actuator output shaft in response to a loss of power whereby the spring will drive the valve in the opposite direction.

U.S. Pat. No. 3,889,924 to Karpenki discloses a valve stem operator in which a threaded valve stem is moved by a jack-nut to open and close the valve. The jack-nut is connected to a drive arbor which is selectively rotated by either the motor or a clock spring. A clutch situated between the worm gear and the drive arbor is fixed by an air cylinder to engage the gear and arbor to allow the motor to open or close the valve. Upon failure of the motor control either the air cylinder or a biasing stripper spring shafts the clutch out of engagement whereupon the clock spring rotates the drive arbor and jack-nut to move the valve stem automatically in a prescribed direction.

Applicant is unaware of spring-return actuators of the type which include a safety clutch which is constructed and arranged in such a manner as to insure that the potential energy within the spring of the spring-return will be completely dissipated before access to the interior of the spring-housing may be accomplished.

SUMMARY OF THE INVENTION

Mechanical springs have been extensively used to apply a torque to the shaft of various types of actuators, and such springs are commonly used in actuators to rotate a valving member to a predetermined position such as, by way of example, to an "open" or a "close" position in the event of the interruption of or failure of the air or electrical supply. The use of spring-actuators requires that sizable amounts of energy be stored in the springs, and serious injuries have occurred to personnel and equipment by reason of the inadvertent release of the spring-stored energy during disassembly or adjustment of spring-powered actuators.

For reasons of safety it is necessary that suitable provisions be made to prevent the inadvertent and potentially hazardous release of the stored energy within the spring of a rotary spring actuator during disassembly or adjustment of the spring-powered device. The subject actuator has been designed in such a manner that any attempt to disassemble it or to adjust the spring tension will result in the automatic and safe release of the spring tension before access may be had to the interior of the housing of the rotary spring-return actuator. The primary objects of the present invention are three-fold in number to wit:

(a) To prevent adjustment or disassembly without the automatic and safe release of the potential energy of spring tension;

(b) To provide an adjustable, enclosed, tamper-proof travel limit suitable for controlling the overall rotational relative movement between the actuator shaft and a clutch plate with which it is operatively associated;

(c) To provide infinite spring tension adjustable between zero and a maximum allowable tension.

The rotary spring-return actuator of the present invention utilizes a combination safety clutch and travel stop which is so correlated with respect to an end of the rotatable shaft as to make it impossible to attain access to the interior of the housing of the actuator until after the stored potential energy of the spring has been completely released.

This is accomplished by providing releasable means in the form of a base plate which includes a surface which is adapted to frictionally engage a surface of the periphery-adjacent edge of the combination safety clutch and travel stop whereby to force the other surface of said clutch and return travel stop against a corresponding surface of the housing whereby the base plate will lock the clutch plate relative to the housing for disposing the rotatable shaft of the spring-return actuator in adjusted position relative to the housing after a suitable or predetermined torque has been applied to the spring which is disposed within the housing with opposite ends thereof secured respectively to the shaft and housing of the actuator.

After the desired amount of tension has been applied to the spring of the actuator, the clutch plate is literally locked to and against relative rotation with respect to the housing in such a manner as to exert a restraining torque to the shaft in opposition to the applied spring torque. This is accomplished by means of cooperating stops on the shaft and clutch plate which engage in such a manner as to allow free rotation of the shaft within a slightly greater than 90° range while at the same time positively prohibiting rotation beyond or outside of the desired range.

The torque thus applied by the spring is of such magnitude as to effectively rotate the shaft of a valve from an open to a closed or from a closed to an open position in the absence of a counter force applied to the plug shaft via a power control actuator which is interposed between the valve and the rotary spring-return of the subject invention.

Whenever the power driven actuator is rotated from a normally off to an on or open position, that rotary motion is imparted to the shaft of the subject rotary spring-return actuator against the counterforce of the spring of the subject actuator thereby increasing the torque and potential energy stored within the spring. Whenever this counterforce is released, such as by way of example, in the event that the power media is interrupted or exhausted, the spring of the subject actuator will immediately effect a turning of the shaft of the subject actuator which turning motion is imparted to the power driven actuator and thence to the valving member.

Figure 2:
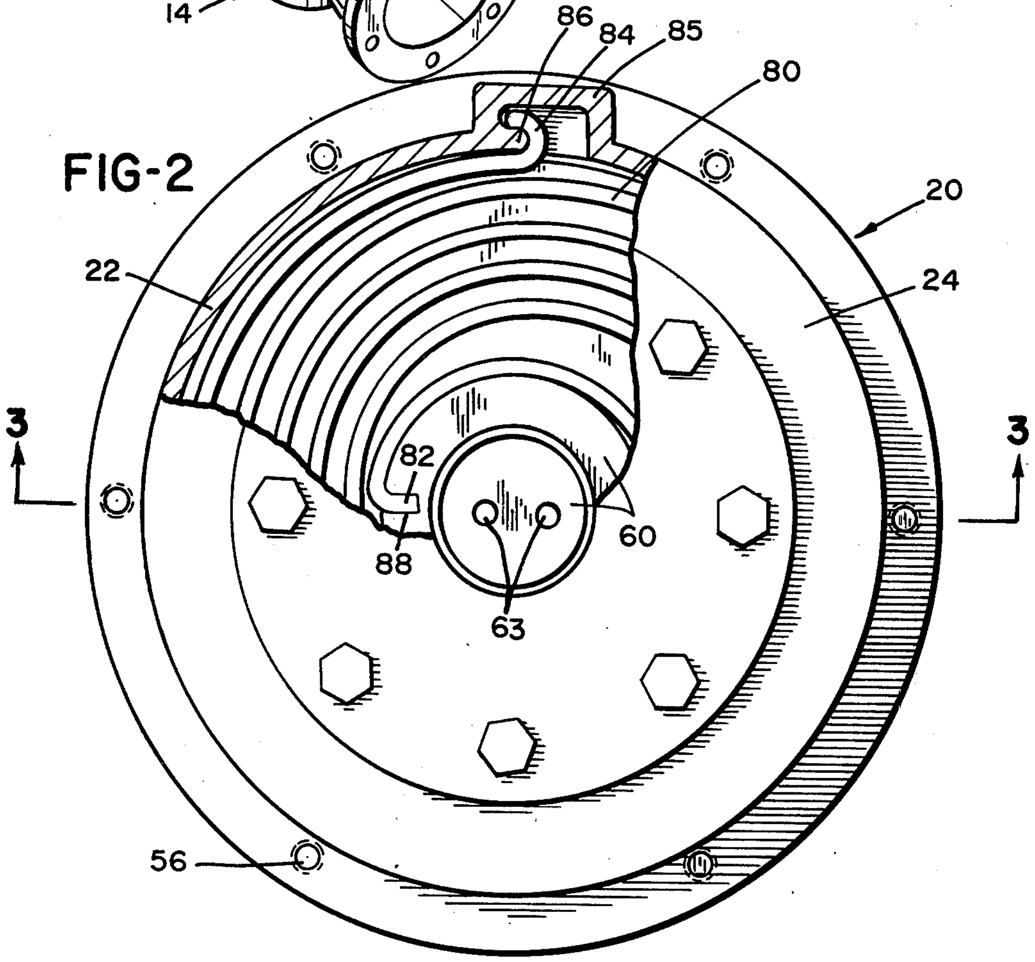
FIG. 2 is a top view of the actuator of the present invention, with a portion of the upper end wallcut away.

FIG, 3 is a vertical sectional view of FIG. 2.

Figure 4:
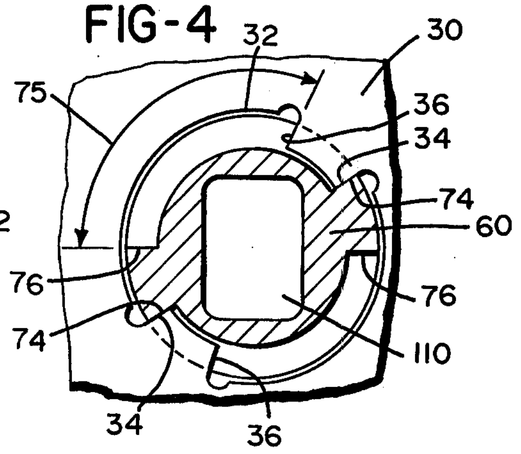
Figure 3:
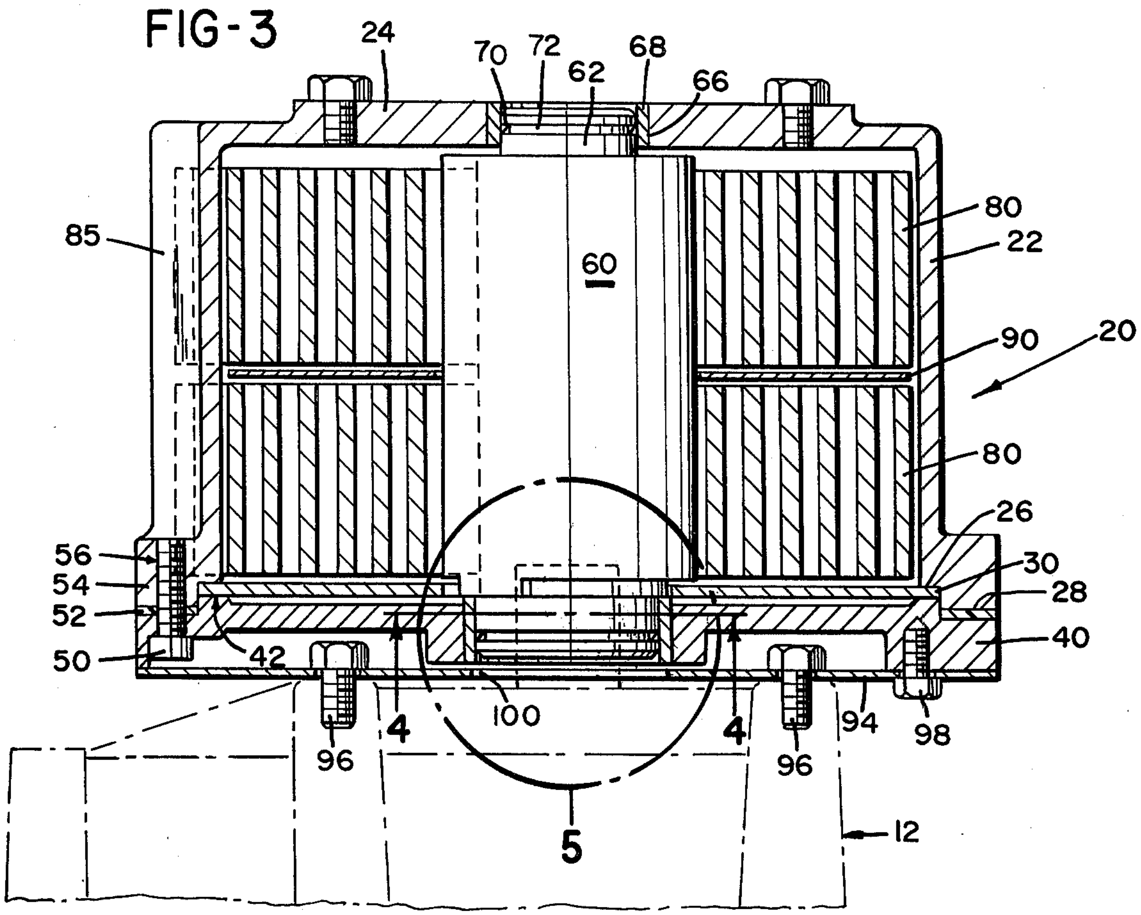

FIG. 4 is a view taken on line 4—4 of FIG. 3.

Figure 5:
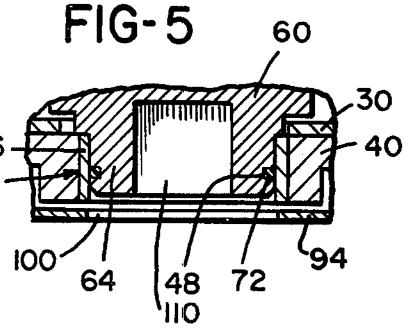

FIG. 5 is a fragmentary sectional view at area 5 of FIG. 3 illustrating the relationship between the lower end of actuator shaft with the clutch and base plates of the actuator housing.

Figure 1:
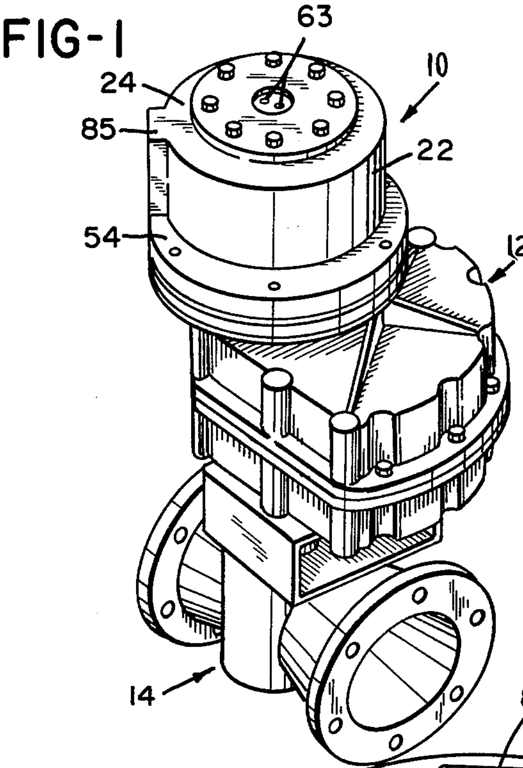
FIG. 1 is a perspective view illustrating the rotary-spring actuator of the present invention operatively associated with a conventional power actuated mechanism which, in turn, is associated with a valving member.
Figure 6:
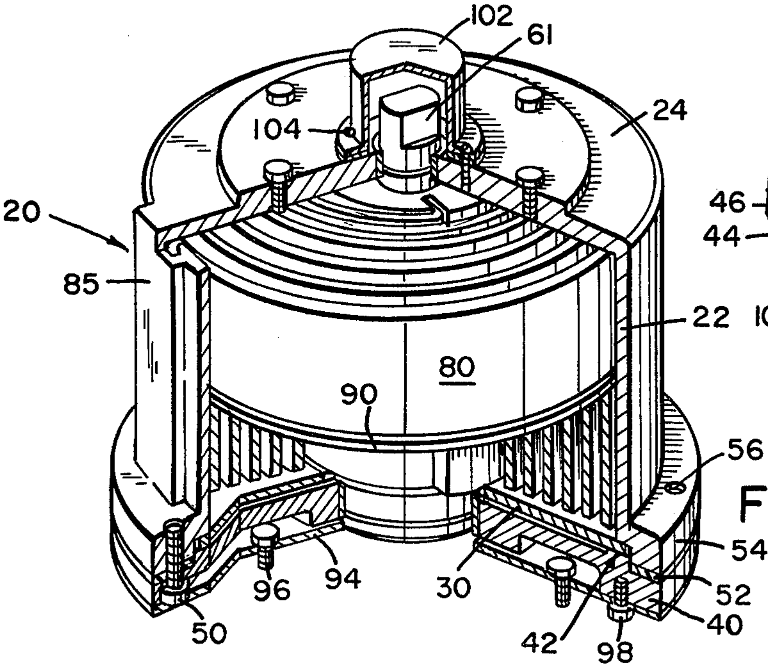

FIG. 6 is a perspective view of a modification of the device of FIG. 1, with parts thereof broken away for disclosing the internal details of the device.

DESCRIPTION OF THE PREFERRED EMBODIMENTS

The actuator of the present invention is indicated by the numeral 10 of FIG. 1 which is securely, though releasably, fastened to the housing of a power actuator 12, which, in turn, is disposed in driving relation with the shaft of a conventional valving member 14. The present invention is neither concerned with, nor directed to, the specific structural details of the power actuator 12 or the valving member 14, however, the structural details of the power actuator 12 are clearly illustrated in the Dejager U.S. Pat. No. 3,554,096, assigned to the assignee of this application.

With particular reference to FIGS. 2, 3, and 6, the numeral 20 designates a substantially u-shaped housing which includes a circular side wall 22 and an end wall 24 at the upper end of the side wall, and werein the other or lower end of the side wall is open.

A circular offset 26 is provided inwardly of the outer end 28 of the side wall.

A combination clutch plate and travel stop 30 is received within offset 26 in spanning relationship with the lower open end of housing 20. The relationship between clutch plate 30 and offset 26 is that of a slip fit so that the clutch plate may, under certain circumstances, be freely rotated within and relative to said offset.

A base plate 40 defines the removable bottom or lower end wall of the housing to which it is securely, though releasably, fastened, by means of bolts 50 which project through openings in the peripheral flange 54 which circumscribes the lower, open end, of side wall 22, and gasket 52 which is interposed between corresponding surfaces of the base plate and the outer end of side wall 22. Bolts 50 are threaded into complimentary internally tapped holes 56 of flange 54.

Base plate 40 includes an upwardly projecting circular abutment surface 42 which is adapted to engage and bear against the lower or under surface of the peripheral adjacent portion of the clutch plate for thereby urging the upper surface of the peripheral adjacent portion of the clutch plate against offet 26 incident to the tightening of bolts 50, whereby the clutch plate is securely, though releaseably, locked or anchored relative to the housing in such a manner as to effectively preclude relative rotation between the clutch plate and the housing.

A central opening 32 is provided in clutch plate 30 for reception of the lower end of shaft 60. In the preferred embodiment of the invention, in which the clutch plate includes a travel-stop for limiting the relative rotation between shaft 60 and clutch plate 30 to a predetermined number of degrees, opening 32, as illustrated in FIG. 4, is formed with pairs of inwardly projecting stop surfaces 34 and 36 which are adapted to be abuttingly engaged by outwardly projecting stop surfaces 74 and 76 of shaft 60. As illustrated in FIG. 4, stop surfaces 74 of shaft 60 engage stop surfaces 34 of the clutch plate opening for establishing the amount by which the shaft can be rotated in a counter clockwise direction relative to the clutch plate. Stop surfaces 76 of shaft 60 will engage stop surfaces of the clutch plate opening when shaft 60 has been rotated in a clockwise direction relative to the clutch plate, against the counter force of coil spring 80, as hereinafter more fully described, as said shaft is rotated in clockwise direction by reason of actuation of the power actuator 12.

If it be assumed that power actuator 12 is utilized to open the valving member of valve 14, stop surfaces of 74 of shaft 60 will engage stop surfaces 34 of the clutch plate opening during those periods of time when the valving mechanism of valve 14 is in a fully closed position, it being noted that energization of the power actuator 12 to open valve 14 will cause shaft 60 to rotate in a clockwise direction, against the counter force of spring 80 until stop surfaces 76 of shaft 60 abuttingly engage shaft 36 of the clutch plate opening.

It should be noted that a feature of the present invention is that the amount of relative motion between the shaft and clutch plate may be conveniently changed by substituting clutch plates having their respective pairs of stop surfaces 34 and 36 spaced apart by greater or lesser amounts thereby determining and defining the overall rotation of shaft 60 as indicated by the double-headed arrow 75 of FIG. 4.

One or more coil springs 80 are disposed within housing 20, wherein the inner end 82 of the spring is received within a vertical slot 88 of shaft 60, and wherein the outer end 84 of the spring is engaged as at 86 in a socket 85 in the side wall 22 of the housing.

With particular reference to FIG. 3, it will be noted that two coil springs 80 are mounted within housing 20 and that a spacer or divider plate 90 is interposed between the adjacent ends of said springs.

The actuator is readied for use by clamping, or otherwise securing, housing 20, in a vise or the like, after which shaft 60 is suitably rotated, by a socket wrench or the like, inserted into opening 110 (FIG. 4) of the lower end of shaft 60 or by a spanner wrench, the pins of which are inserted into openings 63 in the upper end of the shaft (FIGS. 1 and 2) for thereby rotating clutch plate 30 with shaft 60, as the spring is being wound, by reason of engagement between stop surfaces 74 of the shaft with stop surfaces 34 of the clutch plate opening. After the desired amount of torque has thus been applied to the spring (s) bolts 50 are tightened for thereby locking the clutch plate relative to the housing.

The actuator is then ready to be installed on and/or associated with a power actuator, such as 12, in the following manner: A mounting plate 94 having a diameter equal to the diameter of base plate 40 is secured by means of bolts 96 to an upper surface of the housing of a power actuator 12 such as illustrated in U.S. Pat. No. 3,554,096.

Mounting plate 94 is provided with a central opening 100 for accommodating a connection (not illustrated) between shaft 60 of the spring-return actuator and the shaft of power actuator 12.

The housing 20 is then securely, though releaseably, fastened to mounting plate 94 by means of bolts 98.

The upper end 62 of shaft 60 engages bearing 68 which is disposed in opening 66 of the upper end wall 22, and, in the preferred embodiment of the invention an O-ring 70 is received within an O-ring receptive groove 71, as illustrated in FIG. 3.

With particular reference now to FIG. 5, the lower end 64 of shaft 60 is received within bearing 46 which is housed within an opening 44 of the base plate. An O-ring 48 is received within an O-ring receptive groove 72 for providing a fluid-tight fit between the lower end of shaft 60 and the base plate 40, in the same manner in which O-ring 70 provides a fluid-tight fit between the upper end of shaft 60 and end wall 24 of the housing.

The device of FIG. 6 differs from that of FIGS. 1–3 in that the upper end of shaft 60 projects upwardly and outwardly beyond the uppermost surface of end wall 24 for providing flats 61, which may be conveniently engaged by a suitable wrench, tool or the like, for rotating shaft 60 relative to housing 20 while winding spring(s) 80. A cup-like housing 102 is normally secured in closig relationship with respect to the upper end of shaft 60 such as by means of screws 104.

From the forgoing it will be noted that it is impossible to obtain access to the interior of house 20 during those periods of time when spring(s) 80 is under tension, since access to the interior of said housing can be effected only after removal of the base plate securing bolts 50, and, since loosening of bolts 50 will release clutch plate 30 from its "locked" relationship with respect to the housing, the clutch plate and spring(s) 80 will automatically rotate within housing 20 and prior to removal of base plate 40, whereby the spring tension will be completely released.

It should be understood that the subject safety clutch may be fabricated and the spring thereafter suitably energized with the clutch plate locked relative to the housing, whereby the unit per se may be stored and/or shipped for later use without necessitating the user or the device having to wind and/or calibrate the spring tension. The device, per se, is ready to be associated with one end of the shaft or a power actuator and thereby continuously apply a counter torque to shaft 60 during those periods of time when the said shaft has been rotated by a power actuator for disposing the stop surfaces 76 of shaft 10 in abutting relationship with stop surfaces 36 of the clutch opening 32.

The subject device effectively and efficiently accomplishes each of the primary objects of the invention.

What is claimed is:

1. In a rotary spring-return actuator which includes a housing, a shaft rotatably journaled therein, and spring means interposed between and secured relative to said shaft and the interior of the housing; the improvement which comprises the provision of safety means which preclude access to the interior of the housing during those periods of time when the shaft is spring loaded comprising, a clutch plate having means to limit the amount of rotational movement of said shaft relative to said clutch plate interposed between said shaft and housing and means accessible from the exterior of the housing to simultaneously conceal and selectively yet releasably lock said clutch plate relative to said housing against the counterforce of the spring means for continuously subjecting said shaft to predetermined spring tension when the clutch plate is locked relative to the housing, and wherein the spring tension is dissipated incident to rotation of the shaft and clutch plate when the clutch plate is released from a locked relationship with respect to the housing.

2. In a rotary spring-return actuator which includes a housing, a shaft rotatably journaled therein, and spring means interposed between and secured relative to said shaft and the interior of the housing; the improvement which comprises a clutch plate having means to limit the amount of rotational movement of said shaft relative to said clutch plate interposed between said shaft and housing, and means to selectively lock said clutch plate relative to said housing against the counterforce of the spring means for subjecting said shaft to predetermined spring tension, wherein the means to lock the clutch plate relative to the housing comprises a base plate which controls access to the interior of the housing, and fasteners for securely, though releaseably, anchoring said base plate to the housing, whereby loosening of said base plate anchoring fasteners releases the clutch plate and shaft to rotate within and relative to the housing incident to dissipation of the spring tension before access to the interior of the housing may be effected.

3. An actuator as called for in claim 2, wherein the clutch plate includes upper and lower periphery-adjacent surfaces; the housing includes a bearing surface in engagement with said upper periphery-adjacent surface of the clutch plate, and the base plate includes an abutment surface in engagement with the said lower periphery-adjacent surface of the clutch plate when said clutch plate is locked relative to the housing.

4. An actuator as called for in claim 2, wherein an end of the shaft includes means which are engagable externally of the housing for rotating the shaft and clutch plate relative to the housing against the counterforce of the spring during those periods of time when the base plate is loosely secured to the housing.

5. An actuator as called for in claim 2, which includes a mounting plate which is coextensive with the base plate, means for securely, though releasably, mounting said mounting plate to the housing of a device having a rotatable shaft, and other means for securely, though releasably securing the base plate of said actuator to said mounting plate with the shaft of said actuator in driving relationship with the shaft of said device.

6. A rotary spring-return actuator which comprises:
a housing having side walls, an end wall at one end thereof and open at its other end;
a base plate disposed in closing relationship with respect to the open end of the housing;
a rotatable shaft having opposite ends journaled to said end wall and base plate;
coil spring means interposed between and secured relative to said shaft and the interior of said housing;
a clutch plate loosely received within the spanning an offset spaced inwardly of the open end of the housing, said clutch plate including a shaft-receptive opening;
cooperative means on said shaft and clutch plate shaft-receptive opening limiting the degree of rotation of the shaft relative to the clutch plate;
and means securely, though releasably, anchoring the base plate relative to the open end of the housing to dispose the clutch plate in abutting relationship and against relative movement with said offset for imparting a predetermined spring torque to said shaft.

7. An actuator as called for in claim 6, wherein the relationship between the clutch plate and base plate is such that the clutch plate is free to rotate for dissipating the spring torque imparted to the shaft incident to release of the base plate anchoring means and before the said base plate is removed from housing.

8. An actuator as called for in claim 6, wherein the said cooperative means on said shaft and clutch plate shaft-receptive opening comprise pairs of spaced stop surfaces which project outwardly of the shaft and which project inwardly of the clutch opening, said stop surfaces limiting the degree of rotation of the shaft relative to the clutch plate.

9. An actuator as called for in claim 6, wherein the said side walls of the housing are circular, and wherein one end of the coil spring is secured to the interior of said housing and the other end of the spring is secured to the shaft.

10. An actuator as called for in claim 6 which includes a mounting plate having an area which is substantially coextensive with the area of the base plate, and means for securing said base plate to said mounting plate.

11. An acutator as called for in claim 6 which includes means for providing a fluid tight fit between the shaft and the respective end wall and base plate in which it is journaled.

* * * * *

UNITED STATES PATENT OFFICE

CERTIFICATE OF CORRECTION

Patent No. 4,150,182 Dated December 19, 1978

Inventor(s) Dale Aunspach

It is certified that error appears in the above-identified patent and that said Letters Patent are hereby corrected as shown below:

On the title page delete the figure and substitute the figure as shown on the attached sheet.

Signed and Sealed this

***Twenty-fourth* Day of *April 1979***

[SEAL]

*Attest:*

RUTH C. MASON
*Attesting Officer*

DONALD W. BANNER
*Commissioner of Patents and Trademarks*

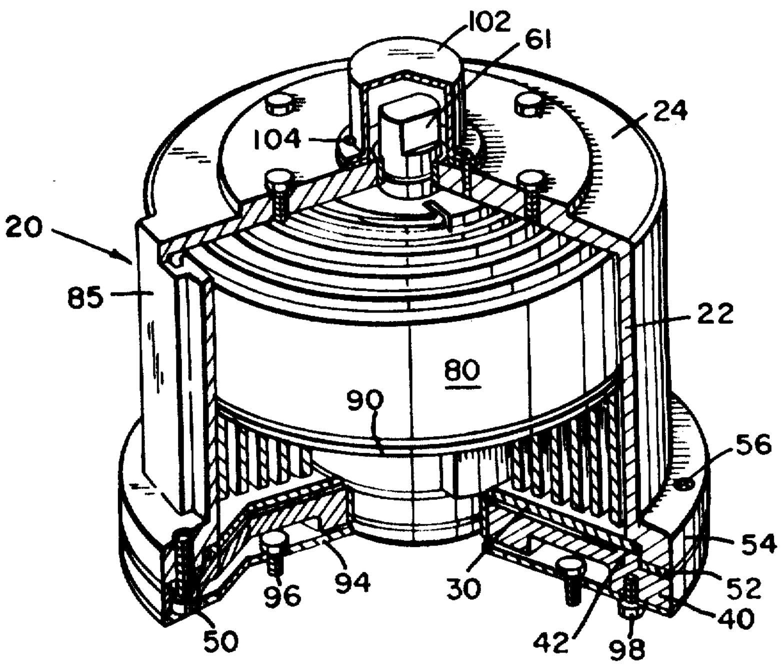
102
61
24
104
20
85
22
80
90
56
54
52
40
50
96
94
30
42
98